United States Patent Office 3,456,486
Patented July 22, 1969

3,456,486
TORQUE MEASURING DEVICE
Johann Kröss, Heidenheim (Brenz), Germany, assignor to Voith Getriebe KG., Heidenheim (Brenz), Germany
Filed Dec. 11, 1967, Ser. No. 689,443
Claims priority, application Germany, Dec. 31, 1966, V 32,680
Int. Cl. G01l 3/00, 25/00, 3/18
U.S. Cl. 73—1
5 Claims

ABSTRACT OF THE DISCLOSURE

A device for calibrating torque tools having a two-arm lever pivotally journalled to a rigid block. The side of one arm in the direction of rotation of the torque tool rests on an abutment on said block. The other arm of said two-arm lever forms a cantilever movable toward said first arm in response to a torque of the tool to be calibrated, the distance between adjacent end portions of said two arms being proportional to the torque to be measured.

---

The present invention relates to a torque measuring device. For screw connections, frequently certain definite tightening forces are prescribed in order to avoid the consequences of an insufficient tightening or a stripping of the thread of screws to be tightened. The torque wrenches and power tools used for this purpose have to be gauged or calibrated and have to be checked from time to time.

For such purpose there has become known a device in which a screw connection is tightened by means of the tool to be calibrated, said screw connection being established between two parallel legs protruding from a rigid block, and said legs being pulled toward each other. By introducing calibrated measuring gauges between the measuring bolts arranged at the end of the legs, the obtained screw preload can be measured. This device which is rather simple has the drawback that different coefficients of friction of the screw and the screw nut enter the measurement as errors.

According to another heretofore known device of the general type involved, a tension rod is employed, and between the introduced torque and the tension rod there is interposed a gear transmission which in its turn has the drawback that different coefficients of frictions are introduced, aside from the fact that the device requires a considerable number of elements and thus is relatively inexpensive. In addition to the above described two devices there are known a number of further devices which, however, without exception are relatively complicated and expensive and awkward in operation.

It is therefore an object of this invention to provide a torque measuring device which will overcome the above mentioned drawbacks.

It is a further object of this invention to provide a torque measuring device of the above mentioned general type which will be simple in construction, can easily be checked, but is, nevertheless, strong and reliable.

It is a still further object of this invention to provide a torque measuring device as set forth in the preceding paragraph, which will always assure a uniform measuring result which can easily be checked.

Figure 1:
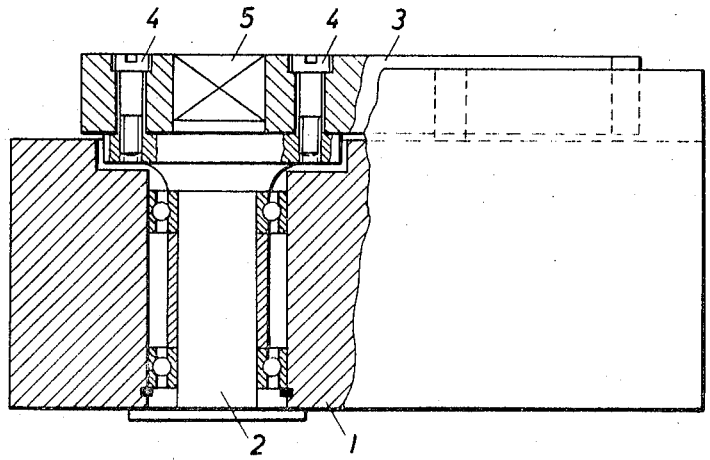

These and other objects and advantages of the invention will appear more clearly from the following specification in connection with the accompanying drawing, in which:

FIGURE 1 diagrammatically illustrates a device according to the present invention, partially in section and partially in view.

Figure 2:
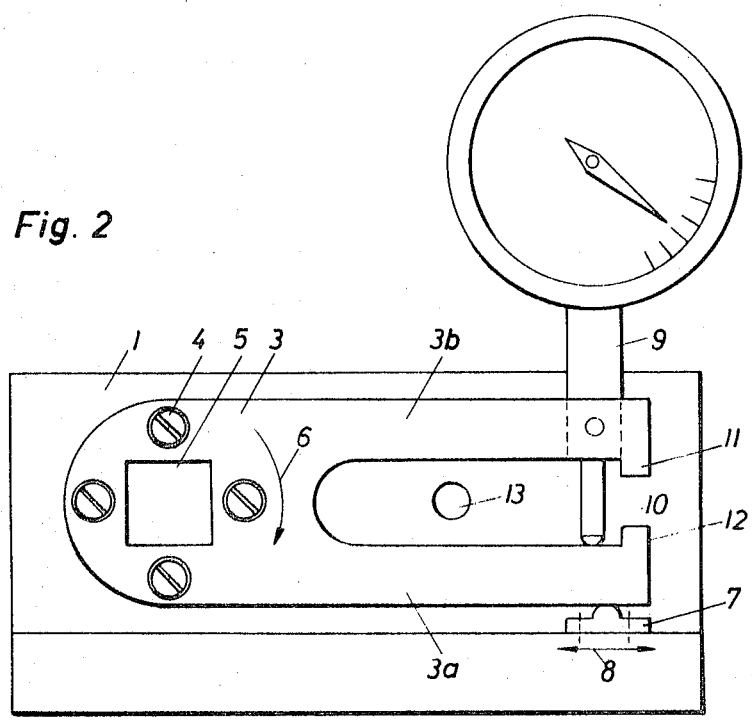

FIGURE 2 is a top view of the device according to FIG. 1.

The torque measuring device according to the present invention, which is particularly useful for calibrating percussion screw drivers and torque wrenches, is characterized primarily by an approximately U-shaped two-arm lever which is easily rotatably journalled in a rigid block by means of a pivot and is provided with a driving square which is coaxial to said pivot, said two-arm lever being operable by exerting a torque thereon. The torque measuring device according to the invention is furthermore characterized in that one end of one arm of said U-shaped two-arm lever in zero position thereof, unilaterally rests on an abutment of the rigid block, and more specifically, the arm's front side when considering the direction of rotation of the torque to be applied, whereas the end of the other arm forms a cantilever, and its distance from the end of the first lever represents a measurement for the applied torque.

For purposes of carrying out a torque measurement, a torque wrench to be gauged or calibrated is inserted into the square of the device, whereupon by means of said torque wrench a torque is exerted upon the two-arm lever in the corresponding direction. The one arm of the two-arm lever which engages the abutment will, when being placed under load, bend accordingly, whereas the other free arm will have its end moving toward the end of the first arm. The extent to which the end of said free arm approaches the end of the first mentioned arm represents a measurement for the magnitude of the applied torque and can be measured by corresponding gauges of different thickness. After the device has been relieved, the free lever arm returns to its starting position. The distance prevailing between the ends of the two arms when the device is under no load can also be checked at any time by a corresponding gauge so that the proper distance will be maintained.

Instead of operating with measuring gauges, the varying distance between the free end of the free lever arm and the end of the other lever arm which engages the abutment can, of course, also be ascertained by means of a dial gauge which may be supported by the free lever arm and has a movable measuring element in engagement with the other or first mentioned lever arm.

While it is also possible to design the two-arm lever in the form of a lever with two aligned arms of which the end of one arm engages the rigid block or an element connected thereto, whereas the other arm by means of its distance from a fixed point of the rigid block indicates the applied torque, it should be noted that with such a design the play in the bearing will enter the measured value so that the precision of the value suffers. From the above, it will be seen that it is important with regard to the present invention that the change in the distance between an arm bending when placed under load and a non-changing other arm of one and the same structural element represents a measurement for the torque to be ascertained or measured.

Referring now to the drawing in detail, the torque measuring device according to the invention, comprises a rigid block 1 which may be clamped into a vise or may be connected to a rigid support. The rigid block 1 has, by means of a pivot 2, pivotally journalled therein a U-shaped two-arm lever 3. The pivot 2 forms a separate part according to the particular embodiment shown in the drawing, and is firmly connected to the two-arm lever 3 by means of four screws 4. Coaxially arranged with regard to said pivot 2 in the web portion of the U-shaped two-arm lever, there is provided a square hole 5 adapted to receive the torque wrench or the like to be calibrated. The direction of rotation of the torque to be applied is indicated by the arrow 6.

One arm 3a of the two-arm lever has the front side of its outermost end in engagement with an adjusting support 7, which for increasing the range of use of the device may be adjustable in the direction of the double arrow 8 by providing corresponding bores in the rigid block 1 for receiving the connecting screws, connecting abutment or support 7 to the rigid block 1. The other end of arm 3b carries a standard dial gauge 9, the measuring pin 10 of which engages the arm 3a.

The ends of the two arms 3a and 3b are provided with cam sections 11 and 12, and the distance between these cam sections must always have a certain value when the device is under no load, and this value can easily be checked by introducing therebetween a checking gauge.

The device is furthermore provided with an additional abutment 13 for preventing an undesired or too-far movement of the free arm or cantilever 3b toward the arm 3a.

It is, of course, to be understood that the present invention is, by no means limited to the particular construction shown in the drawing. Thus, while the pivot 2, according to FIG. 1, is connected by screws 4 to the web portion of the two-arm lever, it is, of course, also possible to make said pivot 2 and said two-arm lever of one single piece, in which instance, of course, the screws 4 are not required.

What I claim is:

1. A device for measuring the torque of tools, especially for calibrating percussion screw driving means and torque wrenches, which includes: a rigid block comprising abutment means, and U-shaped two-arm lever means having a pivot pivotally journalled in said block, and also having a recess substantially coaxial with said pivot for receiving a portion of the tool to be calibrated, one end portion of one arm of said two-arm lever means having that side thereof which in the direction of action of the torque to be applied is the front side resting on said abutment means, and the end portion of the other arm of the said two-arm lever means forming a cantilever, the respective distance between said two end portions being proportional to the torque exerted upon said two-arm lever means by a tool to be calibrated and engaging said recess, and means to sense said distance.

2. A device according to claim 1, in which said sensing means includes a measuring gauge supported by the cantilever forming arm at the end portion thereof, said measuring gauge including a movable pin engaging the adjacent end portion of the other arm.

3. A device according to claim 1, which includes additional abutment means arranged between said two arms of said two-arm lever means.

4. A device according to claim 1, in which said pivot and said two-arm lever means consists of a single piece.

5. A device according to claim 1, in which said pivot is detachably connected to said two-arm lever means.

References Cited

UNITED STATES PATENTS 2,635,453 4/1953 Gentry et al.
2,672,755 3/1954 Hohner.
2,909,055 10/1959 Fish.

LOUIS R. PRINCE, Primary Examiner

H. C. POST III, Assistant Examiner

U.S. Cl. X.R.

73—134